US012654676B2

(12) United States Patent
Rocq et al.

(10) Patent No.: US 12,654,676 B2
(45) Date of Patent: Jun. 16, 2026

(54) CONTROL OF CHARGING PHASES OF A BATTERY OF A VEHICLE WITH A HYBRID POWERTRAIN

(71) Applicant: STELLANTIS AUTO SAS, Poissy (FR)

(72) Inventors: Gaetan Rocq, La Boissiere Ecole (FR); Yohan Milhau, Orgeval (FR); Ridouane Habbani, Asnieres sur Seine (FR); Cedric Launay, Epone (FR)

(73) Assignee: Stellantis Auto SAS, Poissy (FR)

( * ) Notice: Subject to any disclaimer, the term of this patent is extended or adjusted under 35 U.S.C. 154(b) by 0 days.

(21) Appl. No.: 19/152,341

(22) PCT Filed: Jan. 11, 2024

(86) PCT No.: PCT/FR2024/050028
§ 371 (c)(1),
(2) Date: Jul. 30, 2025

(87) PCT Pub. No.: WO2024/165806
PCT Pub. Date: Aug. 15, 2024

(65) Prior Publication Data
US 2026/0109336 A1      Apr. 23, 2026

(30) Foreign Application Priority Data
Feb. 9, 2023      (FR) ....................................... 2301209

(51) Int. Cl.
*B60W 20/13* (2016.01)
*B60K 6/387* (2007.10)
(Continued)

(52) U.S. Cl.
CPC ............. *B60W 20/13* (2016.01); *B60K 6/387* (2013.01); *B60K 6/48* (2013.01); *B60K 6/547* (2013.01);
(Continued)

(58) Field of Classification Search
CPC ...... B60W 20/13; B60W 10/02; B60W 10/06; B60W 10/08; B60W 10/26; B60W 20/40;
(Continued)

(56) References Cited

U.S. PATENT DOCUMENTS

2018/0111605 A1    4/2018  Yun et al.
2022/0009476 A1    1/2022  Cho et al.

FOREIGN PATENT DOCUMENTS

DE    10 2017 110 410 A1    11/2017
EP            3501928 A1     6/2019

OTHER PUBLICATIONS

International Search Report and Written Opinion for Priority Application PCT/FR2024/050028 mailed Apr. 15, 2024.

*Primary Examiner* — Wade Miles
*Assistant Examiner* — Jaewook Jung
(74) *Attorney, Agent, or Firm* — Sandberg Phoenix & von Gontard, PC

(57)      ABSTRACT

A control method is implemented in a vehicle comprising an internal-combustion engine providing a first torque and coupled to a gearbox by a coupling device comprising a hydraulic circuit and delivering a second torque from the first torque in a coupling position, and an electric motor installed between the coupling device and gearbox and producing, from the second torque, a third torque having a negative value opposite to that of the first torque to charge a battery. This method comprises a step (10-20) in which, in the event of a transition between neutral and parking positions during a charging phase, a nullification of the third torque produced is triggered to nullify the first torque before a sudden placement of the coupling device in a decoupling position.

9 Claims, 2 Drawing Sheets

(51) Int. Cl.

| | |
|---|---|
| B60K 6/48 | (2007.10) |
| B60K 6/547 | (2007.10) |
| B60W 10/02 | (2006.01) |
| B60W 10/06 | (2006.01) |
| B60W 10/08 | (2006.01) |
| B60W 10/26 | (2006.01) |
| B60W 20/40 | (2016.01) |
| B60W 30/188 | (2012.01) |
| B60W 30/20 | (2006.01) |
| B60W 40/12 | (2012.01) |

(52) U.S. Cl.
CPC ............ *B60W 10/02* (2013.01); *B60W 10/06* (2013.01); *B60W 10/08* (2013.01); *B60W 10/26* (2013.01); *B60W 20/40* (2013.01); *B60W 30/188* (2013.01); *B60W 30/20* (2013.01); *B60W 40/12* (2013.01); *B60W 2510/0291* (2013.01); *B60W 2710/021* (2013.01); *B60W 2710/0666* (2013.01); *B60W 2710/083* (2013.01); *B60W 2710/244* (2013.01); *B60Y 2200/92* (2013.01)

(58) Field of Classification Search
CPC .... B60W 30/188; B60W 30/20; B60W 40/12; B60W 2510/0291; B60W 2710/021; B60W 2710/0666; B60W 2710/083; B60W 2710/244; B60K 6/387; B60K 6/48; B60K 6/547; B60Y 2200/92
See application file for complete search history.

[Fig. 1]
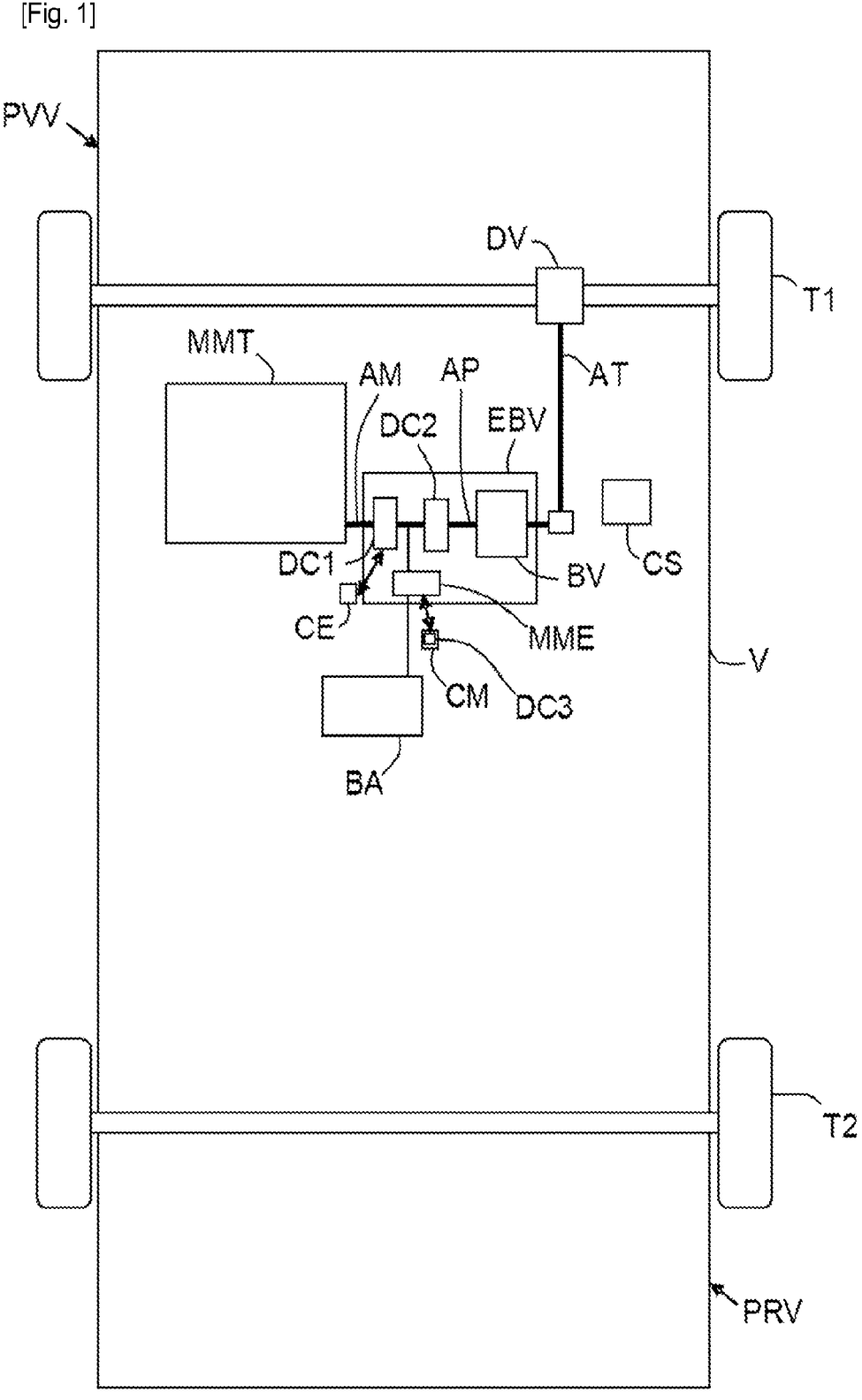

[Fig. 2]
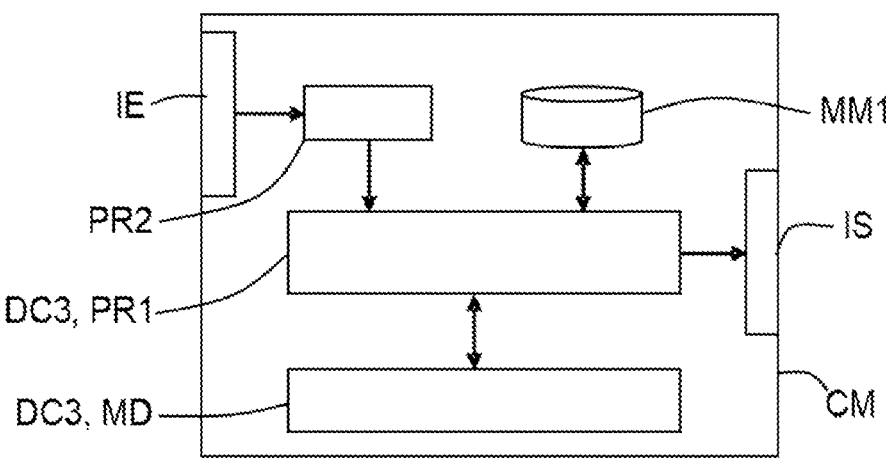
[Fig. 3]
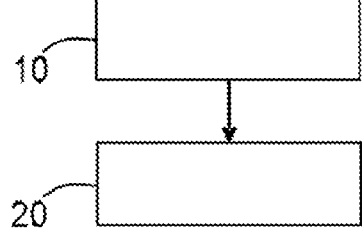

CONTROL OF CHARGING PHASES OF A BATTERY OF A VEHICLE WITH A HYBRID POWERTRAIN

CROSS-REFERENCE TO RELATED APPLICATIONS

This application is the US National Stage under 35 USC § 371 of International Application No. PCT/FR2024/050028, filed Jan. 11, 2024, which claims the priority of French application No. 2301209 filed on Feb. 9, 2023, the content (text, drawings and claims) of both said applications being incorporated by reference herein.

BACKGROUND

Disclosed herein are vehicles comprising a hybrid powertrain and enabling charging of a battery, and more specifically to the control of charging of such a battery.

Some vehicles, which may be of the automotive type, include a hybrid powertrain, that is, comprising at least one internal-combustion engine and at least one electric motor, and a battery that can be charged at least by the latter when it receives torque produced by the internal-combustion engine.

In some hybrid powertrains, the internal-combustion engine is able to be coupled to a gearbox via a hydraulic coupling device (such as a clutch), and the electric motor is installed between this coupling device and the gearbox and associated with the chargeable battery. When the coupling device is in its coupling position and is supplied with a first torque by the internal-combustion engine, it delivers a second torque from this first torque. When the vehicle is in a charging phase, the motor produces from this second torque a third torque, which has a negative value opposite to that of the first torque, in order to charge the associated battery.

In the case of certain hydraulic architectures, for example when the gearbox is of the so-called "dual clutch (or DCT)" type, each time there is a transition between the neutral and parking positions of the gearbox during a charging phase, the pressure in the hydraulic circuit of the coupling device suddenly drops, and therefore the second torque delivered by the latter also suddenly collapses as it is temporarily placed in its decoupled position. The result is a very rapid nullification of the first and third torques, causing a shock accompanied by a surge in the speed of the internal-combustion engine and a collapse in the speed (or severe drop in speed) of the electric motor, which can be heard loud and clear in the passenger compartment. In addition, a shock occurs again when the pressure in the hydraulic circuit of the coupling device suddenly returns to normal, and thus when the coupling device is once again placed in its coupling position, as it is difficult to control the speed of the internal-combustion engine when the second torque transmitted by the coupling device is not precisely known. Such shocks and revving noises can be worrying for vehicle occupants because they don't understand the cause, and so driving pleasure is negatively affected as well as the perceived quality of the vehicle.

The aim is therefore especially to improve the situation.

SUMMARY

For this purpose, the proposed herein is a control method intended to be implemented in a vehicle comprising a powertrain including, on the one hand, an internal-combustion engine able to provide a first torque and to be coupled to a gearbox, offering neutral and parking positions, by a coupling device including a hydraulic circuit and able, in a coupling position, to deliver a second torque from the first torque, and, on the other hand, an electric motor installed between the coupling device and the gearbox and able, in a charging phase, to produce from the second torque a third torque having a negative value opposite to that of the first torque in order to charge an associated battery.

This control method is characterized by the fact that it comprises a step wherein, in the event of a transition between neutral and parking positions during a charging phase, a nullification of the third torque produced is triggered to nullify the first torque before the coupling device is placed in an uncoupling position resulting from a sudden drop in pressure in the hydraulic circuit.

The sudden drop in pressure in the hydraulic circuit no longer has any consequences, which improves driving pleasure and prevents any stress imposed by the hybrid powertrain's hydraulic architecture from damaging the vehicle's perceived quality.

The control method may include other features which can be taken separately or in combination, and especially:

in said step, a nullification can be triggered of the third torque produced immediately after detection of the transition;

in said step, the nullification can be carried out within a time interval that starts at triggering and ends at a determined time;

in the case of the last option, in said step, the nullification can be carried out in a time interval having a duration which is estimated as a function of an estimate of a current temperature of an oil circulating in the hydraulic circuit, this estimated duration ending at the determined time;

in the case of the last sub-option, in said step, the duration can be estimated as a function of data which are stored in at least one table establishing a correspondence between oil temperatures and time interval durations.

Also proposed herein is a computer program product comprising a set of instructions which, when executed by processing means, is able to implement a control method of the type presented above, in a vehicle comprising a powertrain including, on the one hand, an internal-combustion engine able to provide a first torque and to be coupled to a gearbox, offering neutral and parking positions, by a coupling device including a hydraulic circuit and able, in a coupling position, to deliver a second torque from the first torque, and, on the other hand, an electric motor installed between the coupling device and the gearbox and able, in a charging phase, to deliver from the second torque a third torque having a negative value opposite to that of the first torque to charge an associated battery, in order to control battery charging phases in the event of transition between the neutral and parking positions.

Also proposed herein is a control device intended to equip a vehicle comprising a powertrain including, on the one hand, an internal-combustion engine able to provide a first torque and to be coupled to a gearbox, offering neutral and parking positions, by a coupling device including a hydraulic circuit and able, in a coupling position, to deliver a second torque from the first torque, and, on the other hand, an electric motor installed between the coupling device and the gearbox and able, in a charging phase, to produce from the second torque a third torque having a negative value opposite to that of the first torque in order to charge an associated battery.

This control device is characterized by the fact that it comprises at least one processor and at least one memory arranged to perform the operations consisting, in the event of a transition between the neutral and parking positions during a charging phase, in triggering a nullification of the third torque produced to nullify the first torque prior to placement of the coupling device in a decoupling position resulting from a sudden drop in pressure in the hydraulic circuit.

Also proposed herein is a vehicle, which may be of the automobile type, and comprising, on the one hand, a powertrain comprising an internal-combustion engine able to provide a first torque and to be coupled to a gearbox, offering neutral and parking positions, by a coupling device including a hydraulic circuit and able, in a coupling position, to deliver a second torque from the first torque, and an electric motor installed between the coupling device and gearbox and able, in a charging phase, to produce from the second torque a third torque having a negative value opposite to that of the first torque to charge an associated battery, and, on the other hand, a control device of the type presented hereinabove.

BRIEF DESCRIPTION OF THE FIGURES

Other features and advantages will become apparent from examining the detailed description hereinafter, and the appended drawings, in which:

FIG. 1 schematically and functionally shows an exemplary embodiment of a vehicle comprising a control device and a hybrid drive train, and including an electric motor associated with a machine computer, FIG. 2 schematically and functionally shows an exemplary embodiment of a machine computer comprising an exemplary embodiment of a control device, and FIG. 3 schematically shows an example of an algorithm implementing a control method.

DETAILED DESCRIPTION

The purpose is, in particular, to propose a control method and an associated control device DC3, designed to enable control of the charging phases of a battery BA, of a vehicle V comprising a hybrid powertrain, in the event of transition of the gearbox BV between its neutral and parking positions.

In the following, it is assumed, by way of a non-limiting example, that the vehicle V is a type of automobile. This is for example a car, as shown in a non-limiting manner in FIG. 1. However, the described devices are not limited to this type of vehicle. Indeed, they concern any type of vehicle with a hybrid (internal-combustion and electric) drivetrain. It applies to land vehicles (commercial vehicles, camping vans, minibuses, coaches, trucks, motorcycles, road machinery, construction machinery, agricultural machinery, leisure machinery (snowmobiles, go-karts), tracked vehicles, trains and streetcars, for example), aircraft and boats.

FIG. 1 shows a schematic representation of a vehicle V comprising a hybrid drive train (and therefore in particular an internal-combustion engine MMT and an electric motor MME), a machine computer CM, a supervision computer CS, a rechargeable battery BA, and a control device DC3.

As illustrated, the drive train here also comprises a drive shaft AM, a first coupling device DC1, a second coupling device DC2, a gearbox BV, and a transmission shaft AT.

The operation of the powertrain (and therefore the GMP) is supervised by a supervision computer CS.

The internal-combustion engine MMT comprises a crankshaft (not shown) which is securely attached to the drive shaft AM to drive the latter (AM) in rotation. This internal-combustion engine MMT is able to operate at a first speed to deliver a first torque $c_1$, on command from the supervision computer CS. In addition, it (MMT) is able to be coupled to a BV gearbox BV, having a second speed as input, via at least the first coupling device DC1. The latter (DC1) is able to deliver a second torque $c_2$ from the first torque $c_1$, in particular for at least one drive wheel train T1, when it is in its coupled position and therefore when it couples the internal-combustion engine MMT to the gearbox BV.

It should be noted that the operation of the internal-combustion engine MMT is controlled either by a speed setpoint when the first coupling device DC1 is sliding, or by a torque setpoint when the first coupling device DC1 is in its coupling (or closed) position, the speed or torque setpoint being determined by the supervision computer CS.

The second torque $c_2$ is defined by a clutch torque setpoint cce determined by the supervisory computer CS. Note that this clutch torque setpoint cce is transmitted by the supervision computer CS to a computer CE associated with the first coupling device DC1, controlling the operation of the latter (DC1) and responsible for converting this clutch torque setpoint cce into a hydraulic pressure setpoint cph for the hydraulic circuit of the first coupling device DC1.

For example, the first coupling device DC1 may be a hydraulic circuit clutch. But it could be of another type if it includes a hydraulic circuit to move it from its decoupling position to its coupling position (and vice versa).

Also, for example, the drive wheel train T1 can be located in the front part PW of the vehicle V. Preferably, and as illustrated, it is coupled to the drive shaft AT via a differential (here front) DV. In one variant, however, this drive wheel train T1 could be the one referred to as T2, which is located in the rear part PRV of the vehicle V.

The electric motor MME is installed between the first coupling device DC1 and the gearbox BV, and is able to provide a third torque $c_3$, on command from the supervision computer CS. Its operation is controlled by a machine computer CM.

When the first coupling device DC1 has been placed in its coupled (or fully closed) state and the internal-combustion engine MMT is running (and therefore at a first non-zero speed to provide the first torque $c_1$), the first coupling device DC1 delivers a second torque $c_2$ which is added to any third torque $c_3$ supplied, upstream of the gearbox BV, by the electric motor MME when supplied with electrical energy by a chargeable battery BA. When the first coupling device DC1 has been placed in its decoupled (or fully open) state, only the electric motor MME can provide a third torque $c_3$ upstream of the gearbox BV.

The electric motor MME is also arranged, in a charging phase, to charge the associated battery BA in the presence of the second torque $c_2$. More precisely, in a charging phase, it (MME) is able to produce from the second torque $c_2$ (from the first coupling device DC1) a third torque $c_3$ which has a negative value opposite to that of the first torque $c_1$ (provided by the internal-combustion engine MMT) to charge the associated battery BA.

For example, the battery BA may be of the cellular type. In this case, it comprises electrical energy storage cells, possibly electrochemical (such as lithium-ion (or Li-ion) or Ni—Mh or Ni—Cd cells). Also, for example, this battery BA can be of the 450 V type. But this is not a requirement. Alternatively, it could be 48 V or 600 V, for example.

The gearbox BV is automated, and in particular includes (conventionally) a neutral position and a parking position. By way of a non-limiting example, the gearbox BV can be of the double clutch (or DCT) type. However, the described devices are not limited to this type of gearbox (the important thing in particular is that it includes neutral and parking positions).

Note that in the non-limiting example shown in FIG. 1, the first coupling device DC1, the electric motor MME and the gearbox BV form part of a gearbox assembly EBV. But this is not a requirement.

It should also be noted that in the non-limiting example shown in FIG. 1, the drive train also includes a second coupling device DC2 installed downstream of the first coupling device DC1 and electric motor MME and upstream of the gearbox BV. But this is not a requirement. Furthermore, the second coupling device DC2 is part of the gearbox assembly EBV. But this is not a requirement.

As mentioned above, the proposed herein is in particular a control method designed to enable control of the charging phases of the battery BA in the event of the BV gearbox transitioning between its neutral and parking positions, for example as a result of the driver's action on the gearshift lever.

This (control) method can be implemented at least in part by the control device DC3 (shown at least partially in FIGS. 1 and 2), which for this purpose comprises at least one processor PR1, for example a digital signal processor (or DSP), and at least one memory MD. This control device DC3 can therefore be implemented in the form of a combination of electrical or electronic circuits or components (or "hardware") and software modules (or "software"). By way of example, this could be a microcontroller.

The memory MD is RAM in order to store instructions for implementing by the processor PR1 at least part of the control method. The processor PR1 may comprise integrated circuits (or printed circuits), or several integrated circuits (or printed circuits) connected by wired or wireless connections. Integrated circuit (or printed circuit) means any type of device capable of performing at least one electrical or electronic operation.

In the example shown in a non-limited manner in FIGS. 1 and 2, the control device DC3 is part of the machine computer CM. But this is not mandatory. Indeed, the control device DC3 could comprise its own dedicated computer, which is then coupled to the machine computer CM, or could be part of another computer on-board the vehicle V and performing at least one other function (possibly the supervision computer CS), for example.

As shown without limitation in FIG. 3, the (control) method, comprises a step 10-20 which is implemented each time the battery BA is in a charging phase by the electric motor MME by means of the second torque c2 delivered by the first coupling device DC1 from the first torque c1 supplied by the internal-combustion engine MMT.

Step 10-20 of the method comprises a sub-step 10 wherein, in the event of a transition between the neutral and parking positions of the gearbox BV during a charging phase, the control device DC3 triggers the nullification of the third torque c3 produced by the electric motor MME in order to charge the battery BA. This nullification of the third torque c3 is intended to nullify the first torque c1 (supplied by the internal-combustion engine MMT) before the coupling device DC1 is placed in its decoupling position due to a sudden drop in pressure in the hydraulic circuit of the first coupling device DC1 (due to the hydraulic architecture of the hybrid powertrain).

Thus, when the pressure suddenly drops in the hydraulic circuit as a result of the transition, the first c1 and third c3 (opposing) torques are already substantially depleted, so that the collapse of the second torque c2 has no effect. In particular, there is no longer any risk of shock and surge in the speed of the internal-combustion engine MMT and collapse in the speed of the electric motor MME. Similarly, when the pressure in the hydraulic circuit suddenly returns to normal, the speed of the internal-combustion engine MMT is virtually zero and the first torque c1 is zero. As a result, the second torque c2 transmitted by the first coupling device DC1 is substantially zero, thus avoiding the generation of a shock. The described devices therefore enhance driving pleasure, and prevent any constraints imposed by the hybrid powertrain's hydraulic architecture from degrading the quality image of the vehicle V.

Note that the third torque c3 can be nullified, for example, by temporarily disabling operation of the electric motor MME. This operation of the electric motor MME is then enabled again as soon as the second torque c2 transmitted by the first coupling device DC1 is substantially zero, so that charging can resume immediately when the pressure in the hydraulic circuit has returned to normal.

For example, in sub-step 10 of step 10-20, the control device DC3 can trigger nullification of the third torque c3 produced immediately after detecting the transition between the neutral and parking positions of the gearbox BV.

Also in step 10-20, for example, the control device DC3 can carry out the nullification of the third torque c3 produced within a time interval it, which starts when nullification is triggered and ends at a determined time id. This means that nullification can take place gradually over the time interval it. In one variant, however, it could be almost instantaneous.

Also, for example, in step 10-20 the nullification can be carried out (or the control device DC3 can carry it out) of the third torque c3 produced in a time interval it which has a duration di estimated as a function of an estimate of the current temperature of the oil flowing in the hydraulic circuit of the first coupling device DC1. In this case, the estimated duration di ends at the determined time id. This can, for example, be carried out in a sub-step 20 of step 10-20, as shown without limitation in FIG. 3. However, in an alternative embodiment, not shown, this could be carried out in sub-step 10.

The time it takes for pressure to drop in the hydraulic circuit depends mainly on oil viscosity, which in turn depends on oil temperature. In other words, the higher the oil temperature, the faster the pressure drop.

The current temperature of the oil flowing in the hydraulic circuit can be estimated by a sensor present in the hydraulic circuit. But this is not mandatory. In fact, the current temperature of the oil flowing in the hydraulic circuit can be estimated by a sensor in the gearbox BV, since the current temperature of the BV oil is equivalent to that of the hydraulic circuit oil. This estimation can, for example, be carried out in sub-step 10 of step 10-20 at the same time as the nullification is triggered, or immediately afterwards.

Also, for example, in step 10-20 (e.g., sub-step 10) the time di can be estimated (or the control device DC3 can estimate it) on the basis of data stored in at least one correspondence table, e.g., previously determined in the factory (or test center) for a vehicle similar to vehicle V. This correspondence table establishes a correspondence between oil temperatures and time interval durations (for pressure drop).

It should also be noted, as shown in a non-limiting way in FIG. 2, that the machine computer CM (or the computer of the control device DC3) may also comprise a mass memory MM1, in particular for storing each possible oil temperature, as well as any intermediate data used in all its calculations and processing. Furthermore, this machine computer CM (or the computer of the control device DC3) may also comprise an input interface IE for receiving at least each message signaling a transition during a charging phase of the battery BA (by the electric motor MME) and each possible oil temperature, for use in calculations or processing, possibly after formatting and/or demodulating and/or amplifying them, in a manner known per se, by means of a digital signal processor PR2. Moreover, this machine computer CM (or the control device computer DC3) may also comprise an output interface IS, in particular for outputting each message triggering nullification of the third torque c3 and each request to stop or start operation of the electric motor MME.

It will likewise be noted that also proposed herein is a computer program product (or software) comprising a set of instructions which, when executed by processing means like electronic circuits (or hardware), such as, for example, the processor PR1, is able to implement the control method described hereinbefore to control the charging phases of the battery BA of the vehicle V in the event of transition of the gearbox BV between its neutral and parking positions.

The invention claimed is:

1. A control method for a vehicle comprising a drive train including i) an internal-combustion engine providing a first torque and coupled to a gearbox, offering neutral and parking positions, by a coupling device including a hydraulic circuit and delivering, in a coupling position, a second torque from said first torque, and ii) an electric motor installed between said coupling device and gearbox and producing in a charging phase from second torque a third torque having a negative value opposite to that of said first torque to charge an associated battery, wherein it comprises: a step wherein, in the event of a transition between said neutral and parking positions during a charging phase, nullification of said third torque produced is triggered to nullify said first torque prior to placement of said coupling device in a decoupling position resulting from a sudden drop in pressure in said hydraulic circuit.

2. The control method according to claim 1, wherein in said step a nullification is triggered of said third torque produced immediately after detection of said transition.

3. The control method according to claim 1, wherein in said step said nullification is performed in a time interval starting at said triggering and ending at a determined time.

4. The control method according to claim 3, wherein in said step said nullification is performed in a time interval having a duration estimated as a function of an estimate of a current temperature of an oil flowing in said hydraulic circuit, said estimated duration ending at said determined time.

5. The control method according to claim 4, wherein in said step said duration is estimated as a function of data stored in at least one table establishing a correspondence between oil temperatures and time interval durations.

6. A computer program product comprising a set of instructions which, when executed by processing means, is able to implement the control method according to claim 1, in a vehicle comprising a powertrain including i) an internal-combustion engine able to provide a first torque and to be coupled to a gearbox, offering neutral and parking positions, by a coupling device including a hydraulic circuit and able, in a coupling position, to deliver a second torque from said first torque, and ii) an electric motor installed between said coupling device and gearbox and able in a charging phase to produce from said second torque a third torque having a negative value opposite to that of said first torque in order to charge an associated battery, in order to control charging phases of said battery in the event of transition between said neutral and parking positions.

7. A control device for a vehicle comprising a power train including i) an internal-combustion engine able to provide a first torque and to be coupled to a gearbox, offering neutral and parking positions, by a coupling device including a hydraulic circuit and able, in a coupling position to deliver a second torque from said first torque, and ii) an electric motor installed between said coupling device and gearbox and able, in a charging phase, to produce from said second torque a third torque having a negative value opposite to that of said first torque in order to charge an associated battery, wherein it comprises: at least one processor and at least one memory arrange to perform operations consisting, in the event of a transition between said neutral and parking positions during a charging phase, in triggering a nullification of said third torque produced in order to nullify said first torque prior to a placement of said coupling device in a decoupling position resulting from a sudden drop in pressure in said hydraulic circuit.

8. A vehicle comprising a powertrain including i) an internal-combustion engine able to provide a first torque and to be coupled to a gearbox, offering neutral and parking positions, by a coupling device including a hydraulic circuit and able, in a coupling position, to deliver a second torque from said first torque, and ii) an electric motor installed between said coupling device and gearbox and able in a charging phase to produce from said second torque a third torque having a negative value opposite to that of said first torque in order to charge an associated battery, wherein it further comprises a control device according to claim 7.

9. The vehicle according to claim 8, wherein it is of the automobile type.

* * * * *